UNITED STATES PATENT OFFICE.

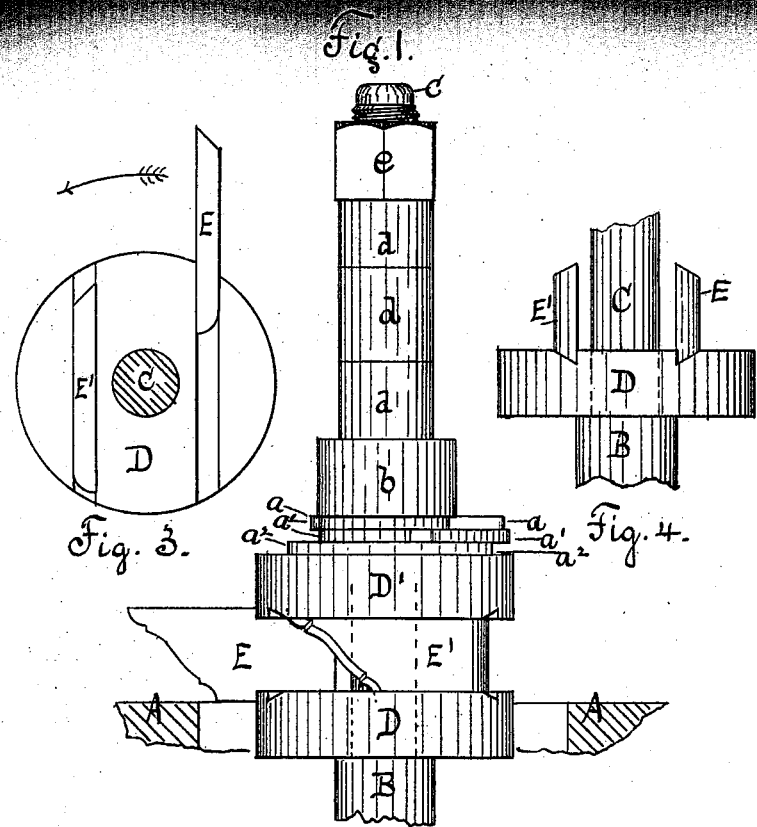

GEORGE W. HILL, OF QUINCY, MASSACHUSETTS.

COUNTER-BALANCE FOR CUTTER-HEADS.

SPECIFICATION forming part of Letters Patent No. 339,886, dated April 13, 1886.

Application filed December 2, 1885. Serial No. 184,427. (No model.)

*To all whom it may concern:*

Be it known that I, GEORGE W. HILL, a citizen of the United States, residing at Quincy, in the county of Norfolk and State of Massachusetts, have invented a new and useful Improvement in Wood-Molding Machines, of which the following is a specification.

The object of my invention is to provide suitable means for balancing the cutter-head of a revolving mechanism for molding the edges of wood or other substances, so that a single cutter set in the head and projecting from it may be enabled to do all the work of molding now usually performed by two such cutters.

In the drawings, Figure 1 shows a cutter-head in elevation and embodying my device. Fig. 2 is a plan of the same. Figs. 3 and 4 show the position of the cutters in the under plate of the cutter-head, and Fig. 5 shows my counterbalancing attachment.

As at present constructed cutters are made in pairs, one projecting from one side of the head and the other from the other side, and as they revolve they balance each other, and this balance is necessary to prevent injury to the machine; but I dispense with one of the cutters, its place being taken by the reverse cutter or a blank, and the balance of the head is preserved by my attachment, thus saving the expense of making the cutters in pairs and also the time necessary in their adjustment, two cutters, one right and one left, being all that are required.

A represents a table; B, the arbor of the shaft supporting the head; C, a spindle extending up from the arbor.

D is the lower plate of the head, and D' the upper plate.

E is the cutter in position for use, and E' the reverse cutter.

$a\ a'\ a^2$ are counterbalance-plates interposed between the plate D' and the washer $b$.

$d\ dd$ are adjusting-washers, and $e$ a nut upon the spindle C, by which the parts of the head are clamped together.

I use one or more of the counter-weights, according to the size and projection of the cutter, and prefer when using several to arrange them as shown in Figs. 1 and 2, thus balancing the projecting cutter and preventing vibration of the head.

What I claim as my invention is—

In combination with a spindle upon which is arranged a cutting-head, one or more balancing-plates upon said spindle and bearing upon the head, the whole being clamped together by a nut, substantially as and for the purpose specified.

GEO. W. HILL.

Witnesses:
CHAS. F. SLEEPER,
KIRBY SILLOWAY.